United States Patent [19]

Goans

[11] Patent Number: 4,479,506
[45] Date of Patent: Oct. 30, 1984

[54] CONDUIT BLOWOUT PREVENTER

[75] Inventor: Kip B. Goans, Harvey, La.

[73] Assignee: Baker Cac, Inc., Belle Chasse, La.

[21] Appl. No.: 406,758

[22] Filed: Aug. 9, 1982

[51] Int. Cl.³ .............................................. F16K 17/40
[52] U.S. Cl. .................................... 137/73; 137/498; 137/505.13; 137/614.18; 91/394; 91/407
[58] Field of Search ...................... 251/1 A, 1 B, 1 R; 137/505.25, 497, 498, 503, 504, 72, 505.13, 614.18, 73, 74, 75; 91/394, 401, 407; 277/205

[56] References Cited

U.S. PATENT DOCUMENTS

| | | | |
|---|---|---|---|
| 2,219,408 | 10/1940 | Benz et al. | 137/505.13 |
| 2,829,670 | 4/1958 | Nix | 137/614.18 |
| 3,638,733 | 2/1972 | De Rouville et al. | 137/72 |
| 4,172,468 | 10/1979 | Ruus | 137/504 |
| 4,199,949 | 4/1980 | Cadeddu | 277/205 |

Primary Examiner—Martin P. Schwadron
Assistant Examiner—Sheri Novack
Attorney, Agent, or Firm—Norvell & Associates

[57] ABSTRACT

The invention provides a conduit blow out preventer utilizing movement of an annular piston to selectively effect the reduction of flow through the blowout preventer to a pre-determinable value or alternately, terminate flow therethrough altogether in response to the occurence of a pressure fluctuation in the fluid conduit to which the conduit is attached. An annular fluid conduit is defined between the interior bore of the annular piston and a support post. A discontinuous annular sealing element is provided in such fluid passage to provide an orifice, creating a pressure differential across the piston in the event of a biased flow surge. Axial movement of the annular piston results in closing of the outward fluid flow in the annular fluid passage and flow is then restricted to that permitted by a radially disposed orifice communicating with the annular fluid passage. A check valve in a fluid inlet is normally held off its seat by a connecting rod extending to the support post. The support post is movable by the annular piston at the end of the annular piston movement to shift the support post sufficiently to permit the check valve to come into close proximity to its mating seat. The connecting rod may incorporate a mass of eutectic material which will melt in response to the temperature generated by a fire to permit the check valve to contact this mating seat to effect shut off of a biased fluid flow.

19 Claims, 5 Drawing Figures

CONDUIT BLOWOUT PREVENTER

BACKGROUND OF THE INVENTION

1. Field of the Invention

This invention relates to a blowout preventer adpated to be connected in series relationship with a line utilized to conduct fluid from an oil well or transmission conduit for the purpose of indicating pressure changes in the conduit.

2. Description of the Prior Art

Blowout preventers have commonly been employed in the small "sense" lines utilized in oil wells and in transmission conduits to feed to a control panel an indication of pressure conditions in the well or conduit. In the event of unusual increase in such fluid pressures, breakage of the sense line or a fire, it is highly desirable that the fluid transmission through the sense line, be interrupted or substantially reduced by a device that is commonly referred to as a blowout preventer. Such blowout preventers also are utilized in a number of similar applications relating to oil field and pipe line applications.

Blowout preventers previously disclosed have normally incorporated valving arrangements which effect the complete shutoff of all fluid flow through the sense line in response to an increase in a biased fluid flow velocity of a preselected magnitude. While such blowout preventers have been adequate from the standpoint of providing protection to the control panel to which the sense line is connected, or preventing large fluid discharge from a broken sense line, they have suffered from the disadvantage that once the blowout preventer has been actuated, some form of manual resetting action has to be performed to restore the blowout preventer to an operative condition. Thus, even though the pressure increase was of a minor duration, prior art blowout preventers would be actuated to their closed position and require resetting.

There is, therefore, a need for a blowout preventer which will permit a volume controlled response to the occurrence of fluid flow surge which will delay the operation of the blowout preventer to its actuated position until a pre-determined small volume of fluid has passed through the device. More importantly, there is a need for a blowout preventer which, except when it is actuated to a closed position by the occurrence of a fire, will not completely close, but only reduce the fluid flow to a safe quantity and yet automatically return to its open position when the monitored fluid flow surge, which caused it to shift to its actuated position, has been eliminated. This allows a pressure sensor to remain active in the instances when there is a fluid flow surge but the sense line has not ruptured.

SUMMARY OF THE INVENTION

This invention provides a sense line blowout preventer characterized by the utilization of an annular piston to effect the reduction of flow through the blowout preventer to a predetermined value or, if desired, to terminate flow therethrough altogether in response to the occurrence of a pressure fluctuation in the fluid conduit to which the sense line is attached. Under normal conditions, fluid flow through the blowout preventer is directed through a restricted width annular passageway defined between an inner cylindrical surface of the annular piston and the exterior surface of the support rod upon which the piston is slidably mounted. An orifice type valve, in the form of a discontinuous annular seal, further restricts this restricted annular flow passage and thus, upon the occurrence of a biased fluid flow in the conduit to which the sense line is attached, a pressure differential is produced across the operative surfaces of the annular piston.

Axial movement of the annular piston, which will be described as an upward movement, in response to such differential pressure brings the end face of the piston into sealing engagement with an end face of the surrounding housing element. For automatic return of the annular piston, a second radial passage is provided in the annular piston containing a conventional orifice which permits a harmless amount of flow to occur through the piston in its actuated position. In the event that complete shutoff of fluid flow through the blowout preventer is then desired, which is particularly desirable in case of fire, a ball type check valve is provided in the axial bore of one of the housing elements and an adjustable length actuating rod extends from the ball of the check valve to a downwardly facing surface provided on the support rod.

The support rod is shiftably mounted in the housing and provided with an abutment which is engaged by the annular piston near the end of its upward movement. The support rod is normally pressure biased to a downward position and the length of the connecting rod can be adjusted so that the ball is retained off its seat until the support rod is moved upwardly by the upward movement of the annular piston to its fully actuated position.

As a further feature of the invention, the connecting rod between the support rod and the ball element of the check valve is positioned in abutting relationship to a mass of eutectic material contained within an axial bore in the support rod. The melting of this material in response to a high temperature, such as would occur during a fire, automatically adjusts the length of the connecting rod and hence permits the check valve to close when the blowout preventer is activated.

In all instances of closing of the blowout preventer other than in response to fire, or when the support rod length is deliberately shortened the annular piston and support rod will return to their normally open flow positions upon cessation of the fluid flow increase which caused them to shift to their actuated position. The annular piston is spring biased to its open or downward position and, as previously mentioned, the support rod is pressure biased to its downward or its normal position.

In some cases, the fluid pressure being sensed will fall below that of the control panel pressure. In such case, it is desired that the excess pressure in the control panel be quickly vented through the blowout preventer. Such venting is accomplished by employing unidirectional lip type seals to effect the sealing engagement of the outer periphery of the annular piston with the interior cylindrical wall of the housing.

Lastly, the housing is provided with a reduced wall thickness region upwardly of the check valve. Hence, if accidental breakage of the device occurs, the check valve will be intact and will close to prevent discharge of fluid.

DESCRIPTION OF THE PREFERRED EMBODIMENTS

Figures 1, 2:
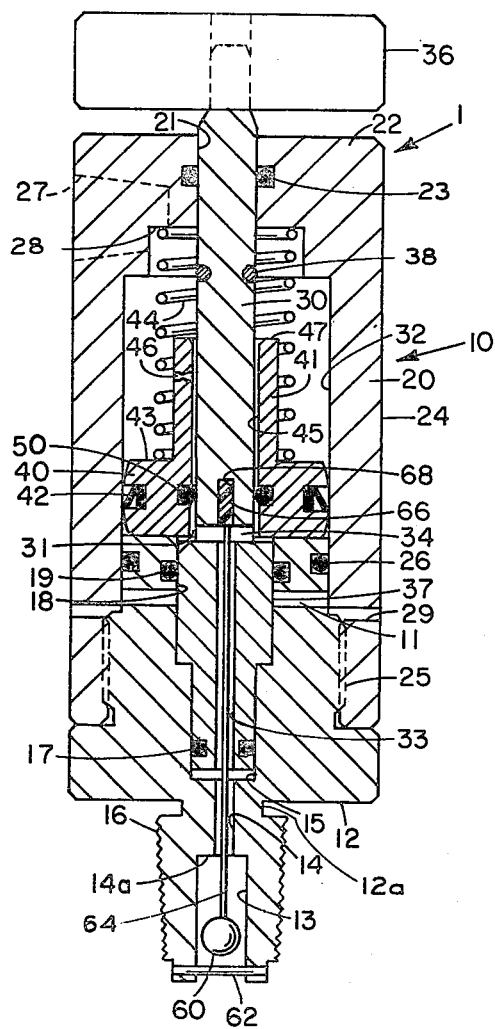
FIG. 1 is a vertical sectional view of a blowout preventer embodying this invention, with the elements thereof shown in the inactive or open fluid flow position.
FIG. 2 is a view similar to FIG. 1 but showing the elements of the blowout preventer in an activated position restricting flow of fluid through the device to a pre-determined quantity.

Referring to FIG. 1, the blowout preventer device 1 comprises a hollow housing assembly 10 which is constructed for series connection between a sense line (not shown) and a fluid pressure source to be monitored (not shown). The hollow housing 10 comprises a hollow plug or body element 12 having an axially extending bore 14 extending therethrough. The lower end of hollow body 12 is of reduced diameter and is provided with external threads 16 for securement to a downhole piece of apparatus or a fluid conduit containing pressurized fluid which is to be monitored.

The hollow housing assembly 10 further includes an inverted cup shaped element 20 having a centrally apertured panel portion 22 and a depending peripheral side wall portion 24. The lower end of side wall portion 24 is threadably engaged with the medial portion of the hollow body 12 as indicated at 25. An annular seal 26 provided in the upper portion of the hollow body 12 effects a fluid seal with the side wall portion 24.

A support post 30 is mounted for vertical movement in the axial bore 21 provided in the panel portion 22 and in an enlarged counterbore 15 provided in the upper end of the bore 14 of the hollow body 12. An annular seal 23 is provided to prevent fluid leakage between the support rod 30 and the panel bore 21, and an annular seal 17 is provided between the bottom portions of the support rod 30 and the counterbore 15 provided in the body portion 12.

There is thus defined an annular fluid chamber 32 between the inner wall of the depending annular side wall portion 24 of the cap 20 and the exterior of the support rod 30. A radially disposed port 27 is provided in the panel portion 22 which communicates between a sense line (not shown) and the annular fluid chamber 32. Thus the chamber 32 is disposed in series relationship between the sense line and the source of fluid pressure to be monitored.

Fluid pressure is supplied to the lower portions of the annular fluid chamber 32 by an axial passage 33 formed in the lower portions of the support rod 30 and connected with the lower portions of annular chamber 32 by a radial passage 34.

An annular piston 40 is mounted for vertical reciprocal movements in the annular fluid chamber 32. Annular piston 40 is provided with a unidirectional lip type seal 42 on its external periphery which sealingly engages the interior wall of the annular side wall 24. The lip seal 42 is of conventional construction and effects a sealing engagement with the side wall 24 only against upwardly directed fluid pressure. Whenever the pressure above piston 40 exceeds that below the piston, the lip seal 42 will permit the passage of fluid, thereby giving the seal a unidirectional characteristic.

Piston 40 is provided with an upstanding axial annular extension 41. Annular extension 41 functions as a guide for a helical spring 44 which is mounted in surrounding relationship to the annular extension 41 and operates between the upwardly facing surface 43 on the piston and the downwardly facing end surface 28 provided on the panel portion 22. A generally radially disposed orifice 46 is provided in the annular piston extension 41 permitting a very limited amount of fluid flow therethrough for a purpose to be hereinafter described.

Figure 5:
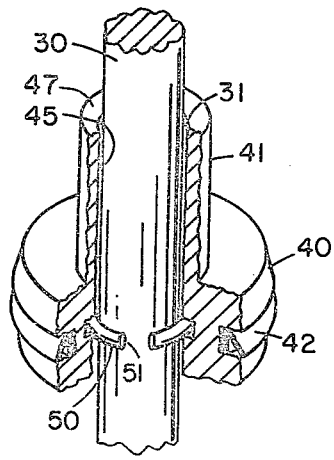
FIG. 5 is a perspective view, partly in section, of the discontinuous annular segment orifice employed in the device of FIG. 1.

The inner cylindrical surface 45 of the annular piston 40 is mounted in sliding but not sealing relationship with respect to the external surface of the support rod 30, thus defining an annular, restricted width fluid passage 31 between such surfaces. To further restrict the fluid flow through the annular passage 31, a discontinuous annular seal element 50 is provided in cooperative relationship between the surfaces. While such seal element may take the form of an O-ring having portions of its periphery relieved, it is preferred to utilize an O-ring 50 (FIG. 5) which has a selected portion of its periphery removed, thus providing a partial O-ring which extends more than a 180° but less than 360° around the periphery of the support rod 30. Such discontinuous annular seal is described in detail and claimed in my co-pending application Ser. No. 406,821, filed concurrently herewith and assigned to the Assignee of this invention, and entitled "Orifice Valve Concept".

Those skilled in the art will recognize that the effective flow rate through the orifice defined by the cut out portion 51 of the O-ring 50 can be varied to a substantial degree by successively cutting off additional portions of the O-ring. Thus, the fluid flow rate along the annular fluid passage 31 may be selected to any value required for the fluid pressure conditions being monitored.

The support rod 30 extends at its upper end entirely through the panel portion 22 and is provided with an enlarged knob 36 which functions to indicate when the blowout preventer valve 1 has been actuated to its flow reducing position. To achieve such indicating movement of the knob 36, a suitable abutment, such as a split ring 38, is secured to the exterior of the support rod 30 at a position above the end face 47 of the annular piston extension 41. Hence, substantial upward movement of the piston 40 must occur before the abutment 38 is engaged and effects the upward movement of the support rod 30 and hence the upward displacement of the indicating knob 36.

It is desirable that the elements of the blowout preventing device be capable of automatic resetting in the event the device is activated to a flow reducing position solely as a result of a pressure surge in the fluid pressure source being monitored. Obviously, in the event of a fire, it is desirable that the device effect a complete cutoff of a fluid flow and not be capable of automatic resetting. As will be explained in detail later, the annular piston 40 is returned to its lower or inactive position by the spring 44. The support rod 30 is biased to its inactive or downward position through the provision of an enlarged diameter portion 37 which slidably and sealably cooperates with a further enlarged counterbore 18 provided in the bore 14 of the hollow body element 12. An annular seal 19 prevents fluid leakage between the external surface of the enlarged rod portion 37 and the interior wall of the counterbore 18. Vent passages 11 and 29 communicate with atmosphere below seal 19. Thus, the existence of any fluid pressure in the annular fluid chamber 32 will exert a downward force on the shiftable support rod 30. Such downward force is readily overcome by the upward movement of the annular piston 40, but is sufficient to effect the return of the support rod 30 to its lower or inactive position after the annular piston 40 has been returned to its lower inactive position.

The blowout preventer device 1 as thus far described will function in response to a significant sustained increase in fluid flow from the fluid pressure source being monitored to reduce the fluid flow path through the device to a level which would result in harmless quantity of fluid being discharged in the event of rupture of the sense line. The fluid flow path is upwardly through the axial passage 33 and radial passage 34 in the support rod 30 to the lower portions of the annular fluid chamber 32, thence upwardly through the annular fluid passage 31 defined between the inner cylindrical wall of piston 40 and the outer periphery of support rod 30, thence through the annular segment opening 51 in O-ring 50, thence into the upper portions of the annular fluid chamber 32 and into the radial port 27 and to the connected sense line (not shown).

Under steady state conditions, the fluid pressure above and below the annular piston 40 will be balanced and the piston 40 will remain in the lower position as illustrated in FIG. 1. Upon the occurrence of a significant increase in the fluid flow pressure source being monitored, the orifice effect of the discontinuous annular seal 50 will cause a pressure differential to build up between the upper and lower surfaces of the annular piston 40, resulting in the generation of an upward force on the piston 40 sufficient to move it to the position illustrated in FIG. 2 if the fluid pressure differential is sustained. As piston 40 moves to its uppermost position, the top surface 47 of the annular extension 41 will engage the downwardly facing end wall 28 of the panel portion 22 and effect an interruption of fluid flow through the annular fluid passage 31 except to the extent permitted by the radial orifice 46 provided in the annular piston 40. As previously mentioned, the orifice 46 is proportioned to permit only a harmless quantity of fluid to flow into the sense line, hence, in the event of sense line rupture, reduces the fluid outflow to a harmless quantity.

As previously mentioned, the upward movement of the annular piston 40 results in an upward displacement of the support rod 30 by virtue of the engagement of the end face 47 of the annular piston extension 41 with the abutment 38 provided on the support rod 30. The elevated position of the indicating knob 36 will apprise the operator that activation of the blowout preventer valve has occurred and he can take the necessary steps to determine the cause of the actuation and to restore the system being monitored to its normal condition.

A significant feature of a blowout preventer embodying this invention is the fact that when the fluid pressure source being monitored is restored to its normal condition, the elements of the blowout preventer device will automatically return to their normal positions, as shown in FIG. 1. The fact that limited fluid flow is permitted in either direction through the secondary orifice 46 permits equalization of the fluid pressures acting on the annular piston 40 and the spring 44 can then return the piston to its lower position. This permits the concurrent return of the support rod 30 to its normal lowered position by virtue of the fluid pressure differential acting on the enlarged diameter portion 37 of the piston rod 30.

In the event that an operator prefers that all fluid flow be terminated upon activation of the blowout preventer device, the device embodying this invention can be readily modified to provide such operation. A third downwardly facing counterbore 13 is provided in the bottom end of the axial bore 14 of the hollow body 12. The counterbore 13 defines an annular ball valve seating surface 14a surrounding the axial bore 14. A ball 60 is mounted in the third counterbore 13 and is of sufficiently large diameter as to be readily moved into sealing engagement with the annular sealing surface 14a upon any upward fluid flow through the bore 14. A transverse pin 62 prevents the ball 60 from dropping out of the counterbore 13.

Figure 3:
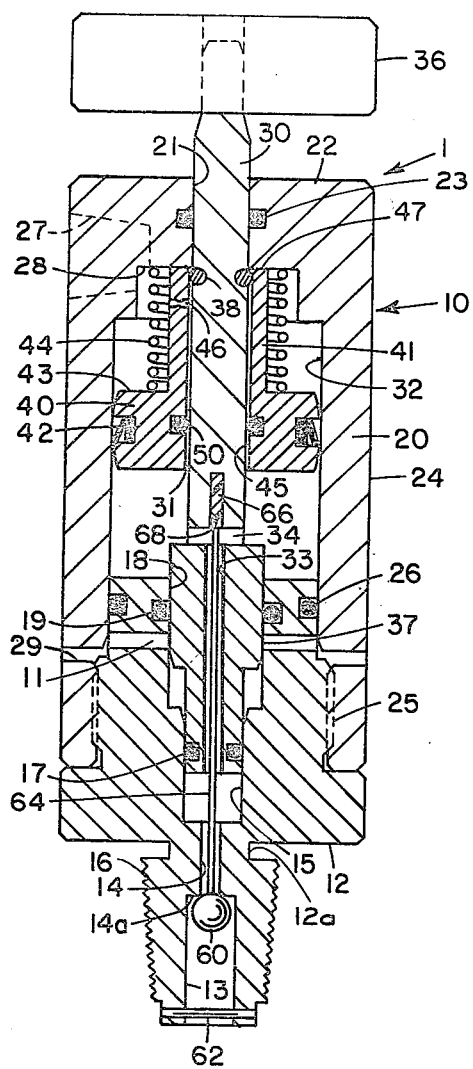
FIG. 3 is a view similar to FIG. 2 but showing a modification of the device permitting complete stoppage of fluid flow through the device upon activation.

A connecting rod 64 is provided which is disposed in abutting relationship between the ball 60 and a downwardly facing surface provided at the end of the axial passage 33 in the support rod 30. The length of connecting rod 64 is selected so that when the support rod 30 is in its lower or inactive position, the connecting rod 64 will maintain the ball 60 in spaced relationship to the annular ball valve seating surface 14a and thus fluid flow from the fluid pressure source being monitored will be maintained. Upon actuation of the annular piston 40 and the subsequent upward movement of the support rod 30 in the manner heretofore described, the connecting rod 64 will be permitted to move upwardly under the influence of upward fluid forces on the ball valve 60 and, when the support rod 30 reaches its extreme upper position, the ball valve 60 will be disposed in sealing engagement with the annular sealing surface 14a and all fluid flow through the blowout preventer device 1 will be terminated (FIG. 3).

Under these conditions, it will be necessary to manually reset the blowout preventer device after the control fluid pressure conditions have stabilized. This will be done by the manual application of a downward force to the indicating knob 36 which will force the ball 60 off its seat and permit fluid pressure conditions within the annular fluid chamber 32 to be stabilized, thus removing any upward bias on the annular piston 40 and permitting it to return to its lower inoperative position shown in FIG. 1, under the bias of the spring 44, if it had not already done so. Concurrently, the control rod 30 will return to its inoperative position under the fluid pressure bias imparted thereto in the manner heretofore described.

The aforedescribed blowout preventer device has the advantage of permitting field modification of the device from a limited discharge type interruption to a complete interruption through the simple expedient of reducing the length of the connecting rod 64. Thus the device would normally be sold with the connecting rod 64 of such length as to maintain the ball valve 60 off its seat, in the position illustrated in FIG. 2, when operation of the blowout preventer device to merely reduce the flow through the device to a harmless level is desired. Operation of the device to completely cut off flow through the device may then be readily accomplished in the field simply by cutting off a portion of the length of the connecting rod 64, thus permitting the device to operate to fully interrupt flow in the manner illustrated in FIG. 3.

It is also desirable that a blowout preventer device function upon the occurrence of an elevated temperature, such as would occur in the case of a fire, to completely cut off flow through the blowout preventer device. This function may be readily accomplished with the device embodying this invention by incorporating a mass of eutectic material 66 in abutting connected relationship with the connecting rod 64. The eutectic material 66 may be conveniently disposed in an axial recess 68 formed at the upper end of the axial passage 33 in the support rod 30. The recess 68 also receives the top end portion of the connecting rod 64.

Figure 4:
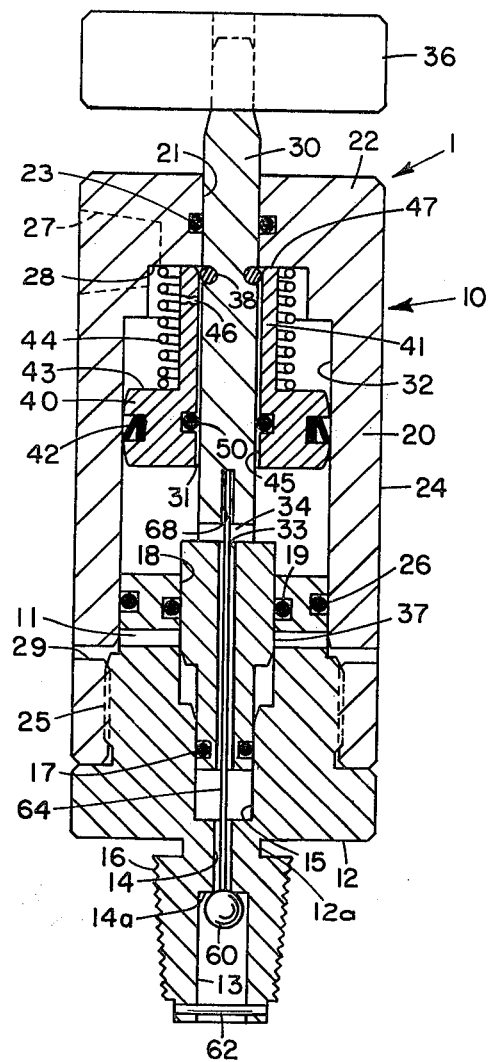
FIG. 4 is a view similar to FIG. 3 but showing the elements of the device in their flow blocking position after the occurrence of a fire.

The operation of this modification of the invention is entirely the same as previously described when pressure fluctuations occur in the fluid pressure being monitored. The length of the connecting rod 64 will determine whether the flow through the blowout preventing device will be limited to a harmless amount or completely shutoff. In the event of fire, however, the increased temperature resulting from the fire will cause the eutectic mass 66 to melt and flow out of the axial recess 68, hence permitting the top end of the connecting rod 64 to move upwardly in such recess and thus permit the ball valve 60 to close on the annular sealing surface 14a (FIG. 4).

A blowout preventing device embodying this invention embodies still one additional safety feature. Such devices are generally disposed in a projecting relationship to a downhole conduit or piece of apparatus, and hence are subject to breakage due to accidental impact. To prevent any discharge of fluid in the event of breakage of the blowout preventer device, the body element 12 of the hollow housing 10 is provided with a reduced wall thickness region 12a at a point immediately above the annular ball valve sealing surface 14a. Thus, if breakage is to occur through impact forces, it will occur in this reduced wall thickness zone which lies outwardly of the ball valve seating surface, permitting the ball valve to immediately seat and prevent fluid flow through the ruptured blowout preventive device.

Although the invention has been described in terms of specified embodiments which are set forth in detail, it should be understood that this is by illustration only and that the invention is not necessarily limited thereto, since alternaitve embodiments and operating techniques will become apparent to those skilled in the art in view of the disclosure. Accordingly, modifications are contemplated which can be made without departing from the spirit of the described invention.

For example, the specification and claims refer to the annular pressure chamber as being vertical. This term is used merely to conveniently describe the locations of various components relative to each other. The device will function with the annular pressure chamber in any position.

What is claimed and desired to be secured by Letters Patent is:

1. A blowout preventer for series insertion in a fluid pressure conduit; comprising: housing means defining a vertical axis, cylindrical walled chamber and ports at opposite axial ends of said chamber adapted for series connection in a conduit with the lower port adapted to communicate with a fluid pressure source to be monitored and the upper port adapted to connect to the conduit; a cylindrical support rod coaxially mounted in said chamber; an annular piston slidably but not sealably mounted on said support rod, thereby defining a restricted width annular fluid passage communicating between said ports; said cylindrical walled chamber having an upper end wall surrounding said support rod; sealing means on the outer periphery of said piston cooperating with the cylindrical wall of said cylindrical walled chamber, whereby a biased fluid flow through said restricted width annular fluid passage produces a pressure differential across said annular piston to produce an upward movement of said annular piston to sealingly abut said upper end wall; an orifice extending radially through said annular piston wall into said annular fluid passage to permit limited fluid flow through said annular fluid passage when said piston abuts said upper end wall, and resilient means urging said annular piston downwardly whereby said annular piston returns to its down position upon termination of said pressure differential.

2. The blowout preventer of claim 1 further comprising a discontinuous annular seal between the inner diameter of said annular piston and said support rod, thereby further reducing fluid flow through said annular fluid passage.

3. The blowout preventer of claim 2 wherein said discontinuous annular seal comprises a partial elastomer seal extending more than about 180° but less than about 360° around said annular fluid passage.

4. The blowout preventer of claim 1 wherein said support rod is slidably mounted in said housing means; and including indicating means connected to the upper end of said support rod, and abutment means on said support rod engagable by upward movement of said annular piston to shift said support rod upwardly and activate said indicating means.

5. The blowout preventer of claim 1 wherein said support rod is axially shiftably mounted in said housing means; and including a downwardly facing, annular check valve seat formed in the lower portions of said housing means in surrounding relation to said lower port; a check valve member vertically shiftably mounted in said housing means below said annular seat, whereby upward fluid flow in said lower port urges said check valve member toward said annular check valve seat; connecting means abuttingly disposed between said check valve member and said support rod to normally hold said check valve member off said annular check valve seat; and abutment means on said support rod engagable by upward movement of said piston to shift said support rod upwardly and permit seating of said check valve member.

6. The blowout preventer of claim 1 wherein said support rod is axially shiftably mounted in said housing means; and including a downwardly facing annular check valve seat formed in the lower portions of said body in surrounding relation to said lower port; a check valve member vertically shiftably mounted in said body adjacent said annular seat, whereby upward fluid flow urges said check valve member toward said annular check valve seat; connecting means abuttingly disposed between said check valve member and said support rod to hold said check valve member off said annular check valve seat, said connecting means including a rigid rod and an abutting mass of eutectic material, whereby the melting of said eutectic material in response to a predetermined temperature increase permits said connecting means to shorten and said check valve member to engage said annular check valve seat.

7. The blowout preventer of claim 6 wherein said support rod has an axially extending hole receiving said mass of eutectic material and the top end of said rigid rod.

8. The blowout preventer of claim 4, 5 or 6 wherein the lower portions of said support rod are sealably mounted in said housing means and are of larger diameter than the upper portions that are sealably mounted in said housing means, thereby producing a downwardly directed fluid pressure force on said support rod.

9. The blowout preventer of claim 5 or 6 wherein said housing means has a reduced wall thickness region above said annular check valve seat, whereby accidental breakage of the blowout preventer will occur in said reduced wall thickness in region and fluid flow will be stopped by said check valve member engaging said annular check valve seat.

10. A blowout preventer for series insertion in a fluid pressure line, comprising: a hollow body having a vertical axial bore and means on the lower end of said body for connection to a fluid pressure source to be monitored; an inverted cup shaped cap element having a top panel portion and a peripheral wall portion depending therefrom; means for sealingly securing the end of said peripheral wall portion to the upper end of said hollow body, thereby defining a vertical axis, cylindrical walled chamber; said panel portion of said inverted cup shaped element having a vertical axial bore therein coaxial with said body bore and a fluid passage connectable with the pressure line; a support rod mounted in said coaxial bores; an annular piston slidably but not sealably mounted on said support rod, thereby defining a restricted width annular fluid passage communicating between said ports; sealing means on the periphery of said piston cooperating with the cylindrical wall of said cylindrical walled chamber; resilient means urging said annular piston downwardly; fluid passage means connecting the lowermost portions of said cylindrical walled chamber with said body bore, whereby pressured fluid from the monitored fluid pressure source will flow through said constricted annular fluid passage to the pressure line, producing a pressure differential across said annular piston so that a fluid flow surge in the monitored fluid pressure results in upward movement of said annular piston to abut said top panel portion; and an orifice extending radially through the upper portion of said annular piston to permit limited flow through said annular fluid passage when said piston abuts said panel portion.

11. The blowout preventer of claim 10 further comprising a discontinuous annular seal between the inner diameter of said annular piston and said support rod, thereby further reducing fluid flow through said annular fluid passage.

12. The blowout preventer of claim 11 wherein said discontinuous annular seal comprises an elastomer element extending more than about 180° but less than about 360° around said annular fluid passage.

13. The blowout preventer of claim 10 wherein said support rod is axially shiftably mounted in said coaxial bores and extends upwardly through said panel portion of said cap element; indicating means connected to the upper end of said support rod, and abutment means on said support rod engagable by upward movement of said annular piston to shift said support rod upwardly and activate said indicating means.

14. The blowout preventer of claim 10 wherein said support rod is axially shiftably mounted in said coaxial bores; a downwardly facing, annular check valve seat formed in the lower portions of said hollow body in surrounding relation to said axial bore; a check valve member vertically shiftably mounted in said body below said annular seat, whereby upward fluid flow through said body urges said check valve member toward said annular check valve seat; connecting means abuttingly disposed between said check valve member and said support rod to normally hold said check valve member off said annular check valve seat; and abutment means on said support rod engagable by upward movement of said piston to shift said support rod upwardly and permit seating of said check valve member.

15. The blowout preventer of claim 10 wherein said support rod is axially shiftably mounted in said coaxial bores; a downwardly facing annular check valve seat formed in the lower portions of said hollow body in surrounding relation to said axial bore; a check valve member vertically shiftably mounted in said body below said annular seat, whereby upward fluid flow through said body urges said check valve member toward said annular check valve seat; connecting means abuttingly disposed between said check valve member and said support rod to hold said check valve member off said annular check valve seat; said connecting means including a rigid rod and an abutting mass of eutectic material, whereby the melting of said eutectic material in response to a pre-determined temperature increase permits said connecting means to shorten and said check valve member to engage said annular check valve seat.

16. The blowout preventer of claim 15 wherein said support rod has an axially extending hole receiving said mass of eutectic material and the top end of said rigid rod.

17. The blowout preventer of claim 13, 14 or 15 wherein the lower portions of said support rod are sealably mounted in said body bore and are of larger diameter than the upper portions that are sealably mounted in said panel bore, thereby producing a downwardly directed fluid pressure force on said support rod.

18. The blowout preventer of claim 14 or 15 wherein said hollow body has a reduced wall thickness region above said annular check valve seat, whereby accidental breakage of the blowout preventer will occur in said reduced wall thickness region and fluid flow will be stopped by said check valve member engaging said annular check valve seat.

19. The blowout preventer of claim 1 or 10 wherein said sealing means on the outer periphery of said annular piston comprises a unidirectional annular seal effecting a seal with said cylindrical chamber wall only against upwardly directed fluid pressure forces.

* * * * *